(12) United States Patent
Pingenat et al.

(10) Patent No.: US 8,539,999 B2
(45) Date of Patent: Sep. 24, 2013

(54) TIRE WITH CHAFER

(75) Inventors: Matthieu Pingenat, Hettange Grande (FR); Filomeno Gennaro Corvasce, Mertzig (LU); Massimo Di Giacomo Russo, Olm (LU); Isabelle Lea Louise Marie Lambert, Arlon (BE); Pierre Bernard Raoul Brochet, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 974 days.

(21) Appl. No.: 12/335,979

(22) Filed: Dec. 16, 2008

(65) Prior Publication Data

US 2010/0147436 A1 Jun. 17, 2010

(51) Int. Cl.
*B60C 5/16* (2006.01)

(52) U.S. Cl.
USPC ........... 152/543; 152/539; 152/517; 152/556; 152/564; 152/547

(58) Field of Classification Search
USPC .................. 152/543, 539, 517, 556, 564, 547
See application file for complete search history.

(56) References Cited

U.S. PATENT DOCUMENTS

| | | | | |
|---|---|---|---|---|
| 2,937,684 A | * | 5/1960 | Rockoff | 152/458 |
| 4,019,551 A | * | 4/1977 | Kolowski et al. | 152/541 |
| 4,483,382 A | * | 11/1984 | Koch et al. | 152/543 |
| 5,065,803 A | * | 11/1991 | Nakatani et al. | 152/543 |
| 5,476,129 A | * | 12/1995 | Shoyama | 152/454 |
| 5,885,389 A | | 3/1999 | Sandstrom et al. | 152/543 |
| 6,719,029 B2 | | 4/2004 | Close | 152/454 |
| 7,025,103 B2 | | 4/2006 | Serra et al. | 152/543 |
| 7,040,369 B2 | | 5/2006 | Hirayama | 152/543 |
| 7,150,301 B2 | | 12/2006 | Serra et al. | 152/525 |
| 7,231,951 B2 | * | 6/2007 | Sandstrom et al. | 152/543 |
| 2001/0042583 A1 | * | 11/2001 | Corvasce et al. | 152/543 |
| 2003/0111152 A1 | | 6/2003 | Colantonio et al. | 152/516 |
| 2006/0162838 A1 | | 7/2006 | Hunt et al. | 152/543 |
| 2007/0144644 A1 | | 6/2007 | Zanzig et al. | 152/209.5 |
| 2008/0121329 A1 | * | 5/2008 | Kurita | 152/528 |
| 2008/0283170 A1 | | 11/2008 | Maruoka | 152/539 |

FOREIGN PATENT DOCUMENTS

| | | |
|---|---|---|
| EP | 1 318 031 A1 | 6/2003 |
| EP | 1 849 626 A1 | 10/2007 |
| JP | 11 320705 | 11/1999 |
| WO | 02/30690 A1 | 4/2002 |

OTHER PUBLICATIONS

European Search Report —Feb. 23, 2010.

* cited by examiner

*Primary Examiner* — Joseph S Del Sole
*Assistant Examiner* — David N Brown, II
(74) *Attorney, Agent, or Firm* — John D. DeLong

(57) ABSTRACT

The present invention relates to a pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer.

3 Claims, 3 Drawing Sheets

TIRE WITH CHAFER

BACKGROUND OF THE INVENTION

Pneumatic rubber tires conventionally have two spaced apart, relatively inextensible beads, usually composed of twisted, or cabled, metallic wires, which are surrounded by rubber components. A significant component which is conventionally positioned around a portion of the bead is the chafer. The chafer is a rubber composition conventionally designed to contact a rigid wheel rim and, therefore, interface between the tire and rim. Rather obviously, the chafer rubber composition must normally be very abrasion resistant, tough, and have a relatively high modulus while also having acceptable flex and rubber fatigue properties as well as having good resistance to cut growth.

The chafer rubber composition is conventionally composed of a diene-based rubber composition which is carbon black reinforced. The chafer rubber composition may optionally contain a textile fabric reinforcement for dimensional stability, where the textile fabric portion of the chafer is conventionally adjacent to the bead portion of the tire, leaving the rubber portion of the chafer to contact the rigid wheel rim when the tire is mounted on such rim and inflated.

Pneumatic tire chafers, their intended interface between the tire bead and rigid wheel rim, as well as their rather demanding physical properties, are considered herein to be well known to those skilled in such art.

Its rubber composition is conventionally composed, for example, of cis 1,4-polyisoprene and cis 1,4-polybutadiene rubber(s) in order to have good abrasion resistance and durability.

SUMMARY OF THE INVENTION

The present invention relates to a pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer.

DETAILED DESCRIPTION OF THE INVENTION

The present invention relates to a pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer.

Figure 1:
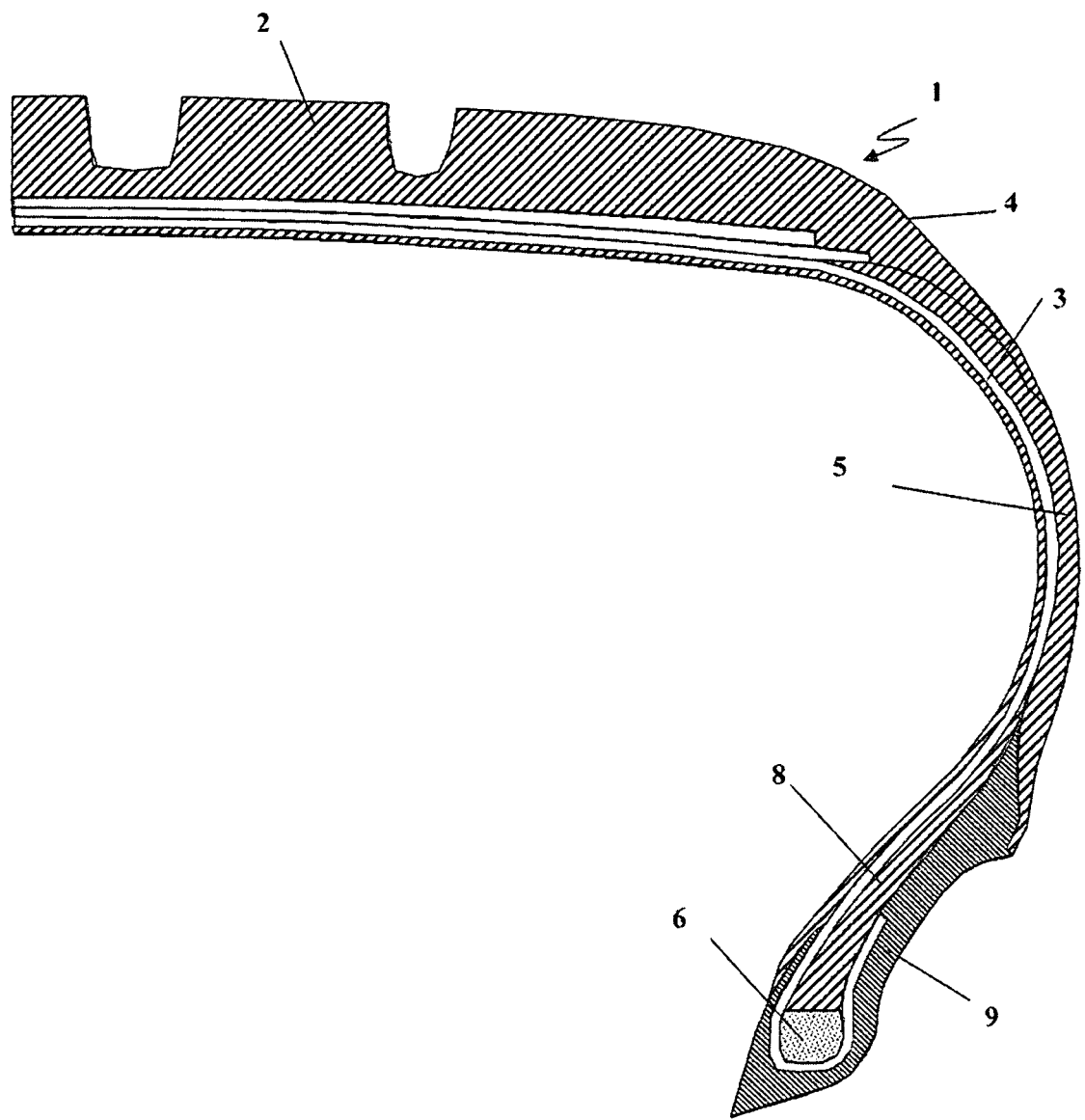
FIG. 1 illustrates a prior art tire.

For illustration of one embodiment of the invention, reference is made to FIG. 1, in which is depicted a cross-sectional view of a belted radial ply tire 1.

In FIG. 1, components of a prior art tire 1 are shown as being its tread 2, sidewall(s) 5, shoulder region(s) 4 abridging the tread 2 and sidewall(s) 5, spaced "bundled" wire beads 6 with apexes 8 and supporting fabric reinforced carcass 3.

The chafer component 9 of the tire is positioned in its bead region 6, basically between the bead 6 and the rigid tire rim on which the tire is to be mounted.

Figure 2:
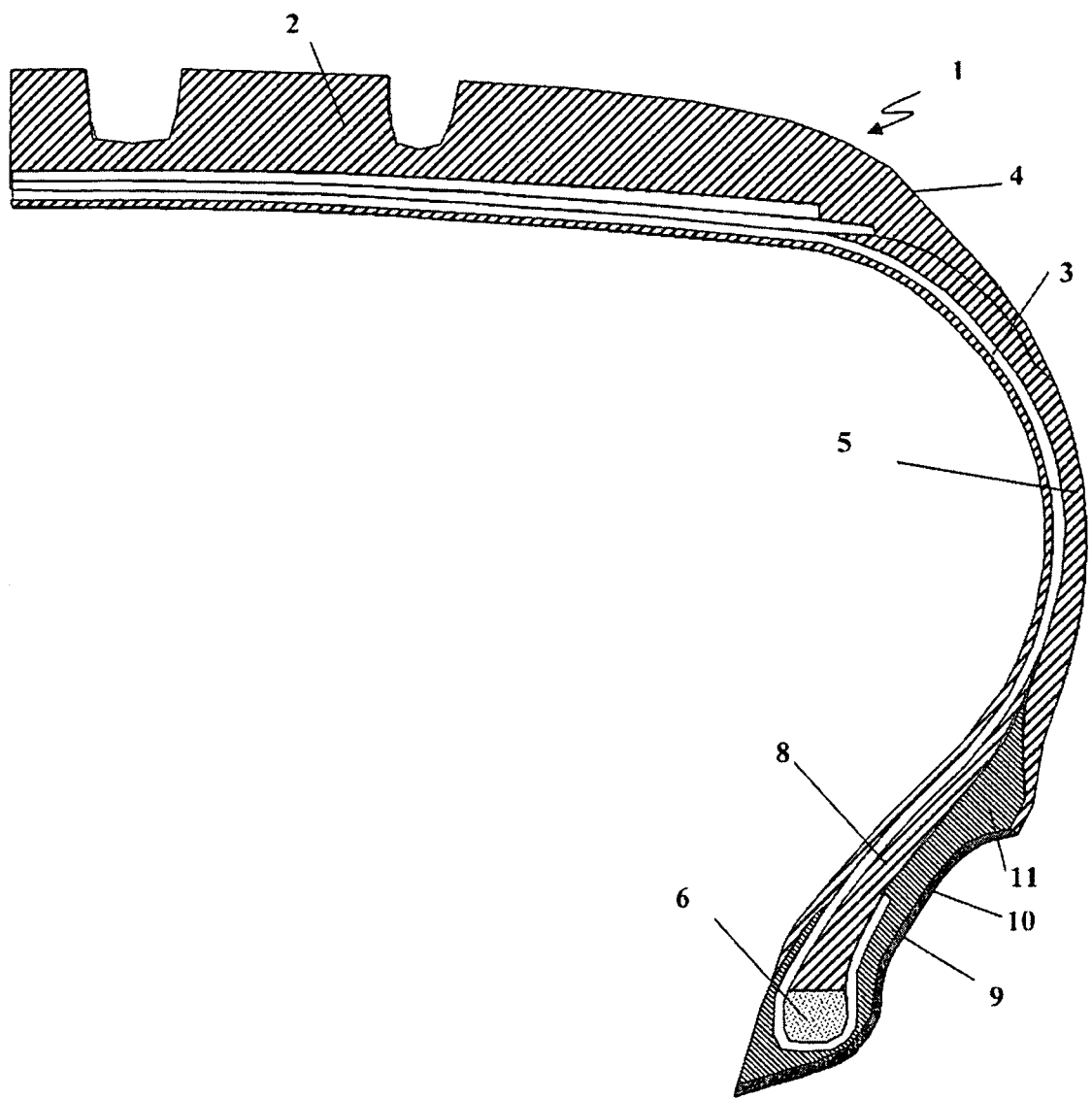
FIG. 2 illustrates a tire according to the present invention.

FIG. 2 depicts a tire of the present invention. In contrast to the prior art tire in FIG. 1, chafer 9 includes an outer skin 10 and an inner core 11, disposed radially inward from the outer skin 10 as shown. The outer skin 10 is intended to contact the rim (not shown), and is constructed from a highly abrasion resistant rubber composition to provide protection from rim abrasion. The inner core 11 by contrast does not contact the rim, and is constructed from a low rolling resistance rubber composition to reduce the overall rolling resistance of the tire.

Outer skin 10 is of a thickness sufficient to provide adequate resistance to tear under the stress impart by the wheel rim. In one embodiment, the outer skin thickness ranges from 1 mm to 3 mm. The inner core 11 is not so limited; the dimensions of the inner core are determined by the overall design of the bead area. In one embodiment, the ratio of the thickness of the outer skin to the overall thickness of the outer skin and inner core may range from 0.1 to 0.5. In one embodiment, the ratio of the thickness of the outer skin to the overall thickness of the outer skin and inner core may range from 0.15 to 0.25.

As indicated, the out skin is constructed from a highly abrasion resistant rubber composition. Such a highly abrasion resistant rubber composition may be compounded using techniques as would be readily apparent to one skilled in the art. In one embodiment, the high abrasion resistant rubber composition is as disclosed in U.S. Pat. No. 5,885,389, where the abrasion resistant rubber composition includes a blend of polybutadiene, natural or synthetic polyisoprene, and styrene-butadiene rubber and from 50 to 75 phr of reinforcing carbon black.

As further indicated, the inner core is constructed from a low rolling resistance rubber composition. Such a low rolling resistance rubber composition may be compounded using techniques as would be readily apparent to one skilled in the art. In one embodiment, the low rolling resistance rubber composition includes a blend of polybutadiene, natural or synthetic polyisoprene, and styrene-butadiene rubber, from 30 to 65 phr reinforcing carbon black, alternatively from 30 to 40 phr reinforcing carbon black, and from 5 to 20 phr of ultra high molecular weight polyethylene. The amount of carbon black may also partially be substituted by silica, from 10 to 35 phr. The reduced amount of reinforcing carbon black or the use of silica serves to reduce the hysteresis of the rubber compound, but with sacrifice of the tear, and the ultra high molecular weight polyethylene serves to keep the stiffness.

In various embodiments, the rubber compositions may contain a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate. Additional examples of rubbers which may be used include a carboxylated rubber, silicon-coupled and tin-coupled star-branched polymers. In one embodiment the rubber or elastomers are polybutadiene, SBR, and synthetic and natural polyisoprene.

In one embodiment, the rubber may be a blend of at least two diene based rubbers. In one embodiment, a blend of two or more rubbers may be used such as cis 1,4-polyisoprene rubber (natural or synthetic), emulsion and solution polymerization derived styrene butadiene rubbers, and cis 1,4-polybutadiene rubbers.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, alternatively about 9 to about 36, percent. The S-SBR can be conveniently prepared, for example, by organo lithium catalyzation in the presence of an organic hydrocarbon solvent.

The cis 1,4-polybutadiene rubber (BR) is considered to be beneficial for a purpose of enhancing the tire wear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition, conventional fillers may be also present. The amount of such conventional fillers may range from 10 to 250 phr. In one embodiment, the filler is present in an amount ranging from 20 to 100 phr.

The commonly employed siliceous pigments which may be used in the rubber compound include conventional pyrogenic and precipitated siliceous pigments (silica). In one embodiment precipitated silica is used. The conventional siliceous pigments that may be employed in this invention are in one embodiment precipitated silicas such as, for example, those obtained by the acidification of a soluble silicate, e.g., sodium silicate.

Such conventional silicas might be characterized, for example, by having a BET surface area, as measured using nitrogen gas, in one embodiment in the range of about 40 to about 600, and in another embodiment in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N115, N121, N134, N220, N231, N234, N242, N293, N299, N315, N326, N330, M332, N339, N343, N347, N351, N358, N375, N539, N550, N582, N630, N642, N650, N660, N683, N754, N762, N765, N774, N787, N907, N908, N990 and N991. These carbon blacks have iodine absorptions ranging from 9 to 170 g/kg and DBP No. ranging from 34 to 150 cm$^3$/100 g.

In one embodiment the rubber composition for use in the tire component may additionally contain a sulfur containing organosilicon compound. Examples of suitable sulfur containing organosilicon compounds are of the formula:

Z-Alk-S$_n$-Alk-Z in which Z is selected from the group consisting of

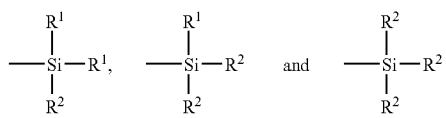

where R$^5$ is an alkyl group of 1 to 4 carbon atoms, cyclohexyl or phenyl; R$^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'- bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment the sulfur containing organosilicon compounds are the 3,3'-bis(trimethoxy or triethoxy silylpropyl) sulfides. In one embodiment the compounds are 3,3'-bis(triethoxysilylpropyl) disulfide and 3,3'-bis(triethoxysilylpropyl) tetrasulfide. Therefore as to the above formula I, in one embodiment Z is

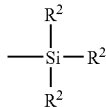

where $R^6$ is an alkoxy of 2 to 4 carbon atoms, with 2 carbon atoms being used in one embodiment; alk is a divalent hydrocarbon of 2 to 4 carbon atoms with 3 carbon atoms being used in one embodiment; and n is an integer of from 2 to 5 with 2 and 4 being used in one embodiment.

The amount of the sulfur containing organosilicon compound of the above formula in a rubber composition will vary depending on the level of other additives that are used. Generally speaking, the amount of the compound of the above formula will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tacktifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur vulcanizing agent is elemental sulfur. The sulfur vulcanizing agent may be used in an amount ranging from 0.5 to 8 phr, with a range of from 1.5 to 6 phr being used in one embodiment. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, in another embodiment about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator is in one embodiment a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The chafer may be a component of various types of pneumatic tires, including but not limited to passenger car tires, truck tires, aircraft tires, and off-the-road tires. Examples of the use of chafers in such tires are disclosed in U.S. Pat. Nos. 4,898,223; 5,885,389; 6,442,280; 6,648,041; and 6,719,029.

In one embodiment, the chafer may be used in a run-flat passenger tire. Such run-flat tires, unlike the abovementioned high pressure and high-torque tires of the aircraft and off-the-road industry, may operate similarly to conventional passenger tires with the exception that these tires generally have stiffened sidewalls that when the tire is operated with little or no air must support the weight of the vehicle. In such situations, high deflection and loads may be transmitted to the bead area of the tire. Rapidly, these uninflated tires may build up high heat which can limit the run-flat capability of the tire. In these circumstances, the run-flat passenger tire may become overstressed and overloaded similar to the conditions seen in the high pressure, high load and high torque applications of the larger aircraft and off-the-road tires. Therefore, the run-flat tire design may also be equipped with the chafer to accommodate these conditions.

The chafer may be constructed by any of various rubber processing methods as are known in the art, including but not limited to calendaring and extrusion. The tire with the chafer may be constructed using methods as are known in the art.

Vulcanization of the tire is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air.

The invention is further illustrated by the following non-limiting examples.

EXAMPLE 1

Figure 3:
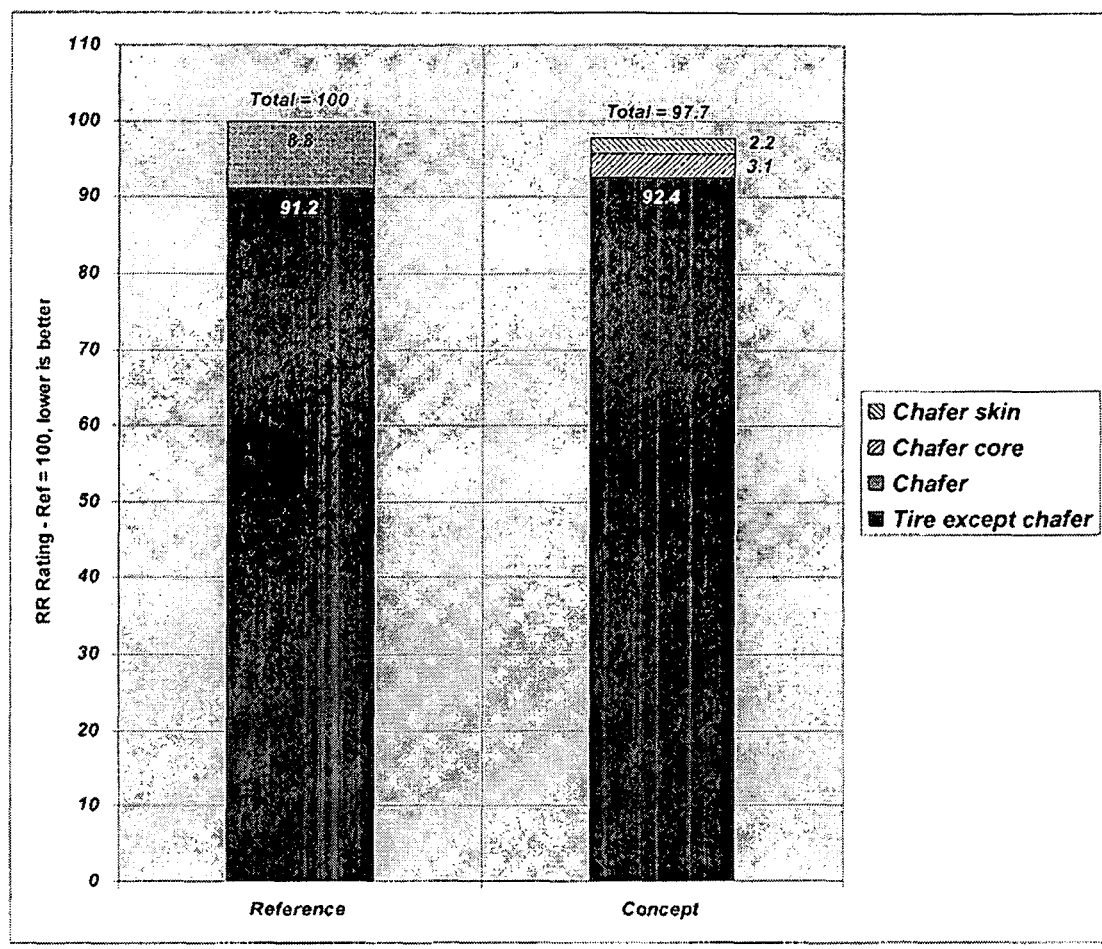
FIG. 3 illustrates a graph of rolling resistance rating.

In this example, the contribution to the overall rolling resistance of a tire by a prior art chafer and by a chafer according to the present invention is illustrated. A finite element analysis (FEA) prediction of the contribution by various tire components to the total rolling resistance of a tire is shown in FIG. 3. As seen in FIG. 3, a chafer according to the present invention results in an overall 2.3 percent reduction in rolling resistance for a tire having the present chafer, as compared to a prior art tire. Thus, in one embodiment the rolling resistance of the tire may be from 1 to 5 percent less than an otherwise identical tire having a chafer of a single rubber compound.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer wherein the inner core layer does not contact the rigid rim; wherein the outer skin layer is constructed from a rubber composition comprising from 50 to 75 phr of reinforcing carbon black and the inner core layer is constructed from a rubber composition comprising from 30 to 40 phr of reinforcing carbon black.

2. The pneumatic tire of claim 1, wherein the rubber composition of the inner core layer further comprises from 5 to 20 phr of ultra high molecular weight polyethylene.

3. A pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer wherein the inner core layer does not contact the rigid rim;

wherein the outer skin layer is constructed from a rubber composition consisting of
100 phr of at least one rubber containing olefinic unsaturation;
from 50 to 75 phr of reinforcing carbon black;
at least one additive selected from the group consisting of sulfur donors, accelerators, retarders, oils, resins, tackifying resins, plasticizers, silica, ultra high molecular weight polyethylene (UHMWPE), pigments, fatty acids, zinc oxides, waxes, antioxidants, antiozonants, peptizing agents, and sulfur containing organosilicon compounds; and the inner core layer is constructed from a rubber composition consisting of
100 phr of at least one rubber containing olefinic unsaturation;
from 30 to 40 phr of reinforcing carbon black; and
at least one additive selected from the group consisting of sulfur donors, accelerators, retarders, oils, resins, tackifying resins, plasticizers, silica, ultra high molecular weight polyethylene (UHMWPE), pigments, fatty acids, zinc oxides, waxes, antioxidants, antiozonants, peptizing agents, and sulfur containing organosilicon compounds.

* * * * *